(12) United States Patent
Bostick et al.

(10) Patent No.: US 9,704,534 B2
(45) Date of Patent: Jul. 11, 2017

(54) GENERATING CONSOLIDATED VIDEO FOR A DEFINED ROUTE ON AN ELECTRONIC MAP

(71) Applicant: International Business Machines Corporation, Armonk, NY (US)

(72) Inventors: James E. Bostick, Cedar Park, TX (US); John M. Ganci, Jr., Cary, NC (US); Sarbajit K. Rakshit, Kolkata (IN); Craig M. Trim, Sylmar, CA (US)

(73) Assignee: International Business Machines Corporation, Armonk, NY (US)

( * ) Notice: Subject to any disclaimer, the term of this patent is extended or adjusted under 35 U.S.C. 154(b) by 1 day.

(21) Appl. No.: 14/868,454

(22) Filed: Sep. 29, 2015

(65) Prior Publication Data

US 2017/0092326 A1 Mar. 30, 2017

(51) Int. Cl.
| | |
|---|---|
| *H04N 5/93* | (2006.01) |
| *G11B 27/00* | (2006.01) |
| *G11B 27/034* | (2006.01) |
| *G06K 9/00* | (2006.01) |
| *G11B 27/11* | (2006.01) |
| *H04N 5/935* | (2006.01) |
| *G08G 1/123* | (2006.01) |
| *G01C 21/34* | (2006.01) |

(52) U.S. Cl.
CPC ........ *G11B 27/034* (2013.01); *G06K 9/00751* (2013.01); *G06K 9/00765* (2013.01); *G11B 27/11* (2013.01)

(58) Field of Classification Search
CPC .......... H04N 5/935; G11B 27/00; H94N 5/93; G08G 1/123; G01C 21/34

USPC ........ 701/400, 426, 532, 533; 386/226, 278, 386/280, 282
See application file for complete search history.

(56) References Cited

U.S. PATENT DOCUMENTS

| | | | |
|---|---|---|---|
| 7,149,961 B2 | 12/2006 | Harville et al. | |
| 8,032,296 B2 | 10/2011 | Bucchieri | |
| 8,754,785 B2 | 6/2014 | Rauscher et al. | |
| 8,763,052 B2 | 6/2014 | Theberge | |
| 8,803,920 B2 | 8/2014 | Kalai et al. | |
| 2007/0070069 A1 | 3/2007 | Samarasekera et al. | |
| 2008/0266142 A1* | 10/2008 | Sula ................... | G01C 21/3647 340/995.17 |
| 2013/0131986 A1* | 5/2013 | Van Seggelen .... | G01C 21/3484 701/533 |

(Continued)

OTHER PUBLICATIONS

Bostick et al., "Consolidating Video Search for an Event", U.S. Appl. No. 14/470,041, filed Aug. 27, 2014, pp. 1-37.

(Continued)

*Primary Examiner* — Daquan Zhao
(74) *Attorney, Agent, or Firm* — Steven F. McDaniel (57) ABSTRACT

A method for generating a consolidated video includes receiving a user indicated path of interest on an electronic map, determining geographical coordinates situated along the received path of interest, identifying video content that display a plurality of regions corresponding to the geographical coordinates situated along the received path of interest, filtering the identified video content into a set of video segments based on a set of user preferences, and stitching the set of video segments into one contiguous video.

14 Claims, 5 Drawing Sheets

(56) References Cited

U.S. PATENT DOCUMENTS

2015/0153933 A1* 6/2015 Filip ................ G06F 17/30265
715/838

OTHER PUBLICATIONS

Bostick et al., "Multi-Source Video Input", U.S. Appl. No. 14/470,029, filed Aug. 27, 2014, pp. 1-32.
Bostick et al., "Video Sequence Assembly", U.S. Appl. No. 14/658,497, filed Mar. 16, 2015, pp. 1-33.
"Instant Google Street View", <https://www.instantstreetview.com/>, printed on Jun. 11, 2015, 1 page.
"Street View", Google Maps, <https://www.google.com/maps/views/streetview?gl=us>, printed on Jun. 11, 2015, 1 page.

* cited by examiner

GENERATING CONSOLIDATED VIDEO FOR A DEFINED ROUTE ON AN ELECTRONIC MAP

BACKGROUND OF THE INVENTION

The present invention relates generally to the field of video analysis, and more specifically to constructing a consolidated video stream of a route on an electronic map.

A growing number of map services enable users to plan routes with increasing customization options. In addition to the ability to select a start point and an end point and receive an optimal path generated by a map service, users can now also interact with said optimal path and edit it to include desired stops along the way or to simply avoid roads with undesirable driving conditions. Users may have any number of preferences that influence what roads they opt to travel on or to avoid traveling on.

SUMMARY

Aspects of the present invention include a method, system, and a computer program product for generating a consolidated video, which include receiving a user indicated path of interest on an electronic map, determining geographical coordinates situated along the received path of interest, identifying video content that display a plurality of regions corresponding to the geographical coordinates situated along the received path of interest, filtering the identified video content into a set of video segments based on a set of user preferences, and stitching the set of video segments into one contiguous video.

DETAILED DESCRIPTION

Users may prefer to travel on some roads as opposed to others for any number of reasons. Some of these reasons may be readily apparent when viewing the roads on a map. Others, however, may be difficult to discern from an overhead view of the roads, as is provided by most available map services. Specific details such as traffic patterns may not be overly obvious when viewing a map. In cases where a map does not quite provide enough route detail, or cases where a user has a particular interest in what the route actually looks like from a driver's perspective, the ability to view a video of the route may be helpful. The method disclosed herein may enable the creation and viewing of such a video by combining a multitude of video segments corresponding to a travel route from multiple available videos. The present invention will now be described in detail with reference to the Figures.

Figure 1:
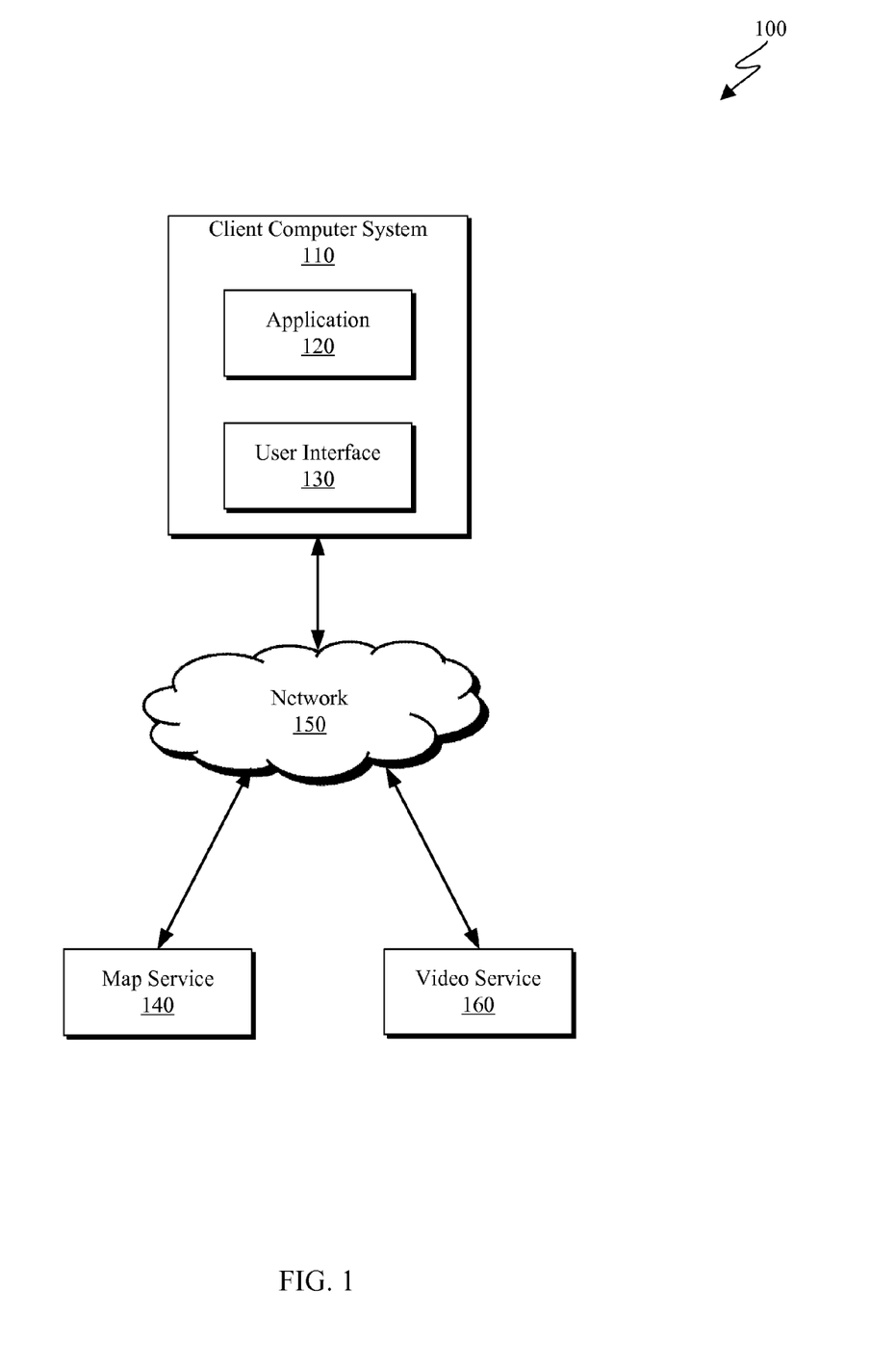
FIG. 1 is a functional block diagram depicting a computing environment in accordance with some embodiments of the present invention.

FIG. 1 is a functional block diagram depicting a computing environment 100 in accordance with an embodiment of the present invention. Computing environment 100 includes client computer system 110, which can be any of a desktop computer, a laptop computer, a specialized computer server, or any other computer system known in the art. In some embodiments, client computer system 110 represents a computer system utilizing clustered computers and components to act as a single pool of seamless resources when accessed through network 150. In general, client computer system 110 is representative of any electronic device, or combination of electronic devices, capable of executing machine-readable program instructions, as described in greater detail with regard to FIG. 4.

Client computer system 110 may include application 120 and user interface 130. Application 120 may be configured to consolidate video segments corresponding to a user indicated path. Application 120 may receive geographical coordinate information from map service 140 and query video service 160 for video content corresponding to the received coordinate information. Application 120 receives video content from video source 160 and stitches appropriate video segments together to provide a contiguous video displaying the path of interest. The specifics of one embodiment of a video consolidation method executed by application 120 are described with respect to FIG. 2. Application 120 communicates with map service 140 and video service 160 via network 150 (e.g. using TCP/IP).

User interface 130 may be an interface enabling the user to provide a path of interest on an electronic map. In one embodiment, user interface 130 may be a graphical user interface configured to display an electronic map the user is able to manipulate and draw a path on. In another embodiment, user interface 130 may enable the user to select a starting location and an ending location, and may provide these locations to map service 140.

Map service may be any application or service known in the art capable of displaying map information and enabling a user to indicate a path of interest along a displayed map. In some embodiments, map service 140 may also incorporate GPS services capable of identifying a user's location and display map information corresponding to the user's surrounding area. Additionally, map service 140 may generate a path to a user selected endpoint. In one embodiment, map service 140 provides geographical coordinates (longitude and latitude, GPS coordinates, etc.) corresponding to the path to application 120.

Video service 160 may be any service through which video content is available to application 120 via network 150. In one embodiment, video service 160 receives coordinate information from application 120 and provides video content corresponding to the received coordinate information to application 120. Video service 160 communicates with client computer system 110 via network 150 (e.g. using TCP/IP).

Network 150 can be, for example, a local area network (LAN), a wide area network (WAN) such as the Internet, or a combination of the two, and include wired, wireless, or fiber optic connections. In general, network 150 can be any combination of connections and protocols that will support communications between server computer system 190 and client computer system 110 in accordance with an embodiment of the present invention.

Figure 2:
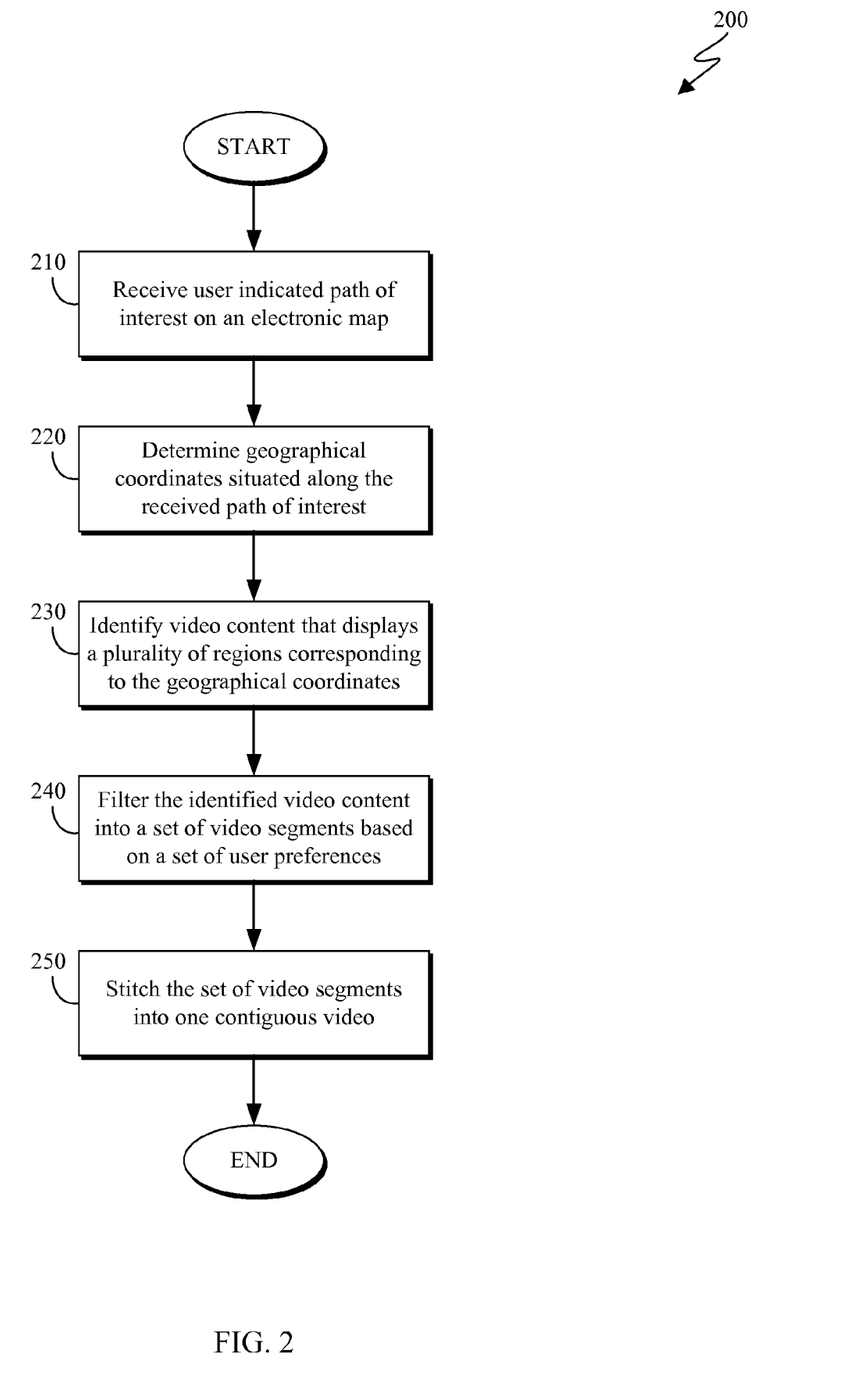
FIG. 2 is a flowchart depicting a route video consolidation method in accordance with some embodiments of the present invention.

FIG. 2 is a flowchart depicting a video consolidation method 200 in accordance with some embodiments of the present invention. As depicted, the video consolidation method 200 includes receiving (210) a user indicated path of interest on an electronic map, determining (220) geographical coordinates situated along the received path of interest, identifying (230) video content that display a plurality of regions corresponding to the geographical coordinates situated along the received path of interest, filtering (240) the identified video content into a set of video segments based on a set of user preferences and stitching (250) the set of video segments into one contiguous video. Video consolidation method 200 may enable creation of a video depicting a path for which a contiguous video does not currently exist.

Receiving (210) a user indicated path of interest on an electronic map may include receiving a map segment containing a path of interest as indicated by a user. In one embodiment, the path of interest is created by a map service upon receiving a starting point selection and an ending point selection from a user. In another embodiment, the path of interest is indicated by the user by selecting roads along the path or by tracing a path via a graphical user interface. In addition to receiving the map segment, receiving (210) a user indicated path of interest may additionally include receiving a set of user preference information. In one embodiment, the user preference information includes user indicated preference information corresponding to what characteristics of a video segment prioritize the inclusion of said video segment in the consolidated video. For example, if there are multiple video segments corresponding to part of a path, the user preference information may indicate that the user prefers that a segment that is tagged as a video related to travel or driving be included. Another user may indicate in the user preference information that he/she prefers that the most recent segments be included.

Determining (220) geographical coordinates situated along the received path of interest may include identifying a set of geographical coordinates corresponding to the path of interest. In one embodiment, the set of geographical coordinates may include a set of GPS coordinates corresponding to points along the path of interest. In some embodiments, the set of geographical coordinates may include a set of longitude and latitude coordinates corresponding to points along the path of interest. The set of geographical coordinates may include multiple types of coordinates to enable a more comprehensive search for relevant video content.

Identifying (230) video content that displays a plurality of regions corresponding to the geographical coordinates situated along the received path of interest may include querying one or more video services for video content tagged with the identified set of geographical coordinates. In one embodiment, the user can indicate a set of preferred video services to be queried via the user preference information. In said embodiment, the user can also indicate whether said preferred video services are the only services to be queried, or if video content from said video services is simply preferred and used when available.

Filtering (240) the identified video content into a set of video segments based on a set of user preferences may include receiving the identified video content that displays the plurality of regions corresponding to the geographical coordinates situated along the path of interest. The video content is then analyzed to determine which content optimally matches the criteria indicated by the user via the user preference information while providing a comprehensive view of the path of interest. Filtering (240) video content may additionally include removing video segments that depict duplicate sections of the path of interest. If two videos depict the same section of the path of interest, one of the segments may be removed based on the set of user preferences. In one embodiment where two segments correspond to the same region of the path of interest, the older segment may be filtered out. Many video sources provide creation dates corresponding to their video content, which enables the "ages" of video segments to be compared. Video segments that are the most recent may be preferable because they may depict a more accurate version of what the path now looks like.

In some embodiments, filtering (240) the video content additionally includes analyzing any content tags corresponding to the video segments. Some video sources apply content tags to video content indicating what field the video relates to. In one embodiment, a user may indicate via the set of user preferences that he or she prefers video content with a "Travel" tag. Not all videos will have content tags, but in a case where two videos correspond to the same region of the path of interest and only one has a "Travel" tag, the video without the "Travel" tag may be filtered out. In some embodiments, video content is associated with corresponding descriptive data hosted by the video source. Analyzing content tags may include parsing the descriptive data for a video to identify any included content tags.

In some embodiments, filtering (240) the video content additionally includes analyzing any ratings or view counts to determine which segments should be filtered. For example, if two videos correspond to the same region of the path of interest, the video with a lower rating may be filtered out as the low rating may be an indication of lower quality. Similarly, if ratings are unavailable for either of the ratings, or if they are rated the same, the video with the lower view count may be filtered out.

In one embodiment, filtering (240) the video content may include clustering any video segments that were recorded in a similar timeframe. For example, if three video segments corresponding to three different sections of the path of interest were recorded in August 2013, these video segments may all be included in the set of video segments to be consolidated. These video segments may be identified by analyzing the creation dates of the video segments, and including such segments is preferable in some cases as it may provide a more consistent depiction of the path than video segments taken a number of years apart. In some embodiments, a user may prioritize filtration criteria via the set of user preferences. For example, a user may indicate that prioritization should occur based on ratings above all else when available, Filtering (240) the video content may additionally removing video content that does not display the path of interest. Filtering the content may include leveraging currently existing video content analysis (VCA) techniques. In one embodiment, the video content is filtered using object detection to verify the presence of certain objects that indicate the video does indeed correspond to the path of interest. The detected objects may be objects that are typical of a path of interest. For example, object detection may be utilized to verify the presence of other cars and guardrails, which may be a strong indication that the video was taken on a road. The video content may be analyzed with respect to a configurable set of objects. For example, if the path of interest corresponds to a nature trail and not a road, the user may not be interested in the presence of other vehicles. Predetermined sets of objects corresponding to rural paths or nature trails or roads and highways may be available.

Video content analysis techniques may be leveraged not only to filter out entire video segments that are deemed irrelevant to the path of interest, but also to determine which sections of videos are relevant to the path. For example, a video segment may undergo object detection that reveals the segment contains an adequate number of objects that indicate the segment is relevant to the path of interest. However, for a video in which the scene changes, the majority of these relevant objects may exist in a certain timeframe, such as the second half of the segment. In these cases, filtering (240) the video content further includes using existing video techniques such as simple video cropping or trimming to remove the sections of the video that do not contain an adequate number of objects relevant to the path.

Stitching (250) the set of video segments into one contiguous video may include receiving the set of optimal video segments to be consolidated. Responsive to filtering the video content, the provided set of video segments are joined in geographical order. That is, the videos are placed in order beginning with the video whose geographic coordinates are closest to the starting point of the path of interest and ending with the segment whose geographic coordinates are closest to the ending point of the path of interest. The videos may be stitched together using non-linear editing systems and techniques. In non-linear editing, the original video source files are not modified or lost during the editing process. These techniques often utilize simple "copy and paste" techniques, where the relevant section of a video is copied from the source video and pasted into the appropriate place in the created consolidated video. Once video segments corresponding to all regions of the path of interest have been added to the consolidated video, the entire path is depicted by the combination of video segments, and the consolidated video may be displayed to a user.

Figure 3A:
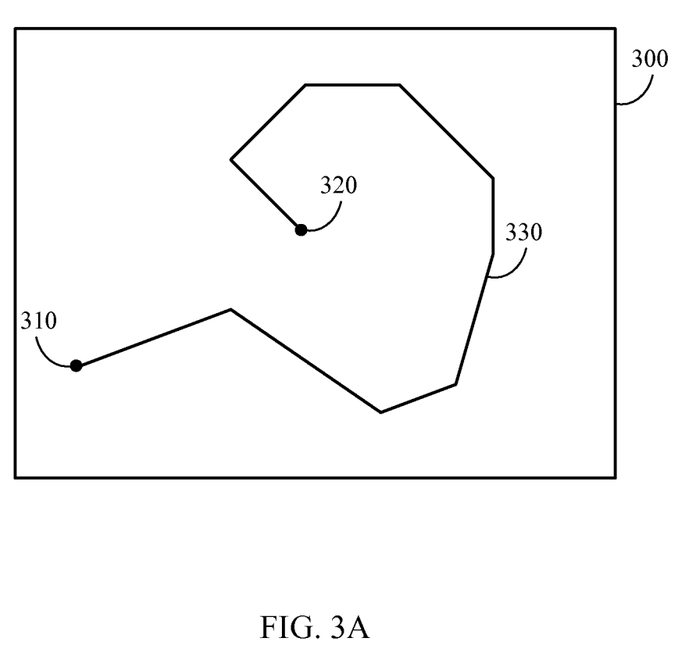
FIG. 3A is a diagram depicting a map space in accordance with one embodiment of the present invention.

FIG. 3A is a diagram depicting a map space 300 in accordance with one embodiment of the present invention. As depicted, map space 300 includes a start point 310, an end point 320, and a path of interest 330. Map space 300 may correspond to a part of a map on which a user has indicated the path of interest 330. In the depicted embodiment, the user has drawn the path of interest 330 beginning at start point 310 and end point 320. The map space 300 may be an example of a map space that can be analyzed by a video consolidation method.

Figure 3B:
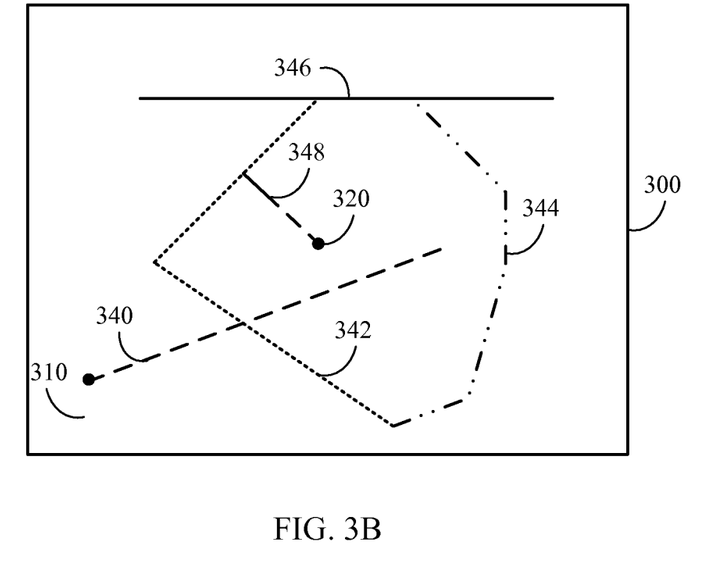
FIG. 3B is a diagram depicting a map space and a set of corresponding video segments in accordance with one embodiment of the present invention.

FIG. 3B is a diagram depicting map space 300 along with a plurality of video segments corresponding to the geographical coordinates within the map space 300. The plurality of video segments each contain video content corresponding to the paths 340, 342, 344, 346, and 348 depicted in map space 300. The plurality of video segments whose paths are depicted in FIG. 3B may correspond to an identified set of optimal video segments such as is discussed with respect to FIG. 2.

Figure 3C:
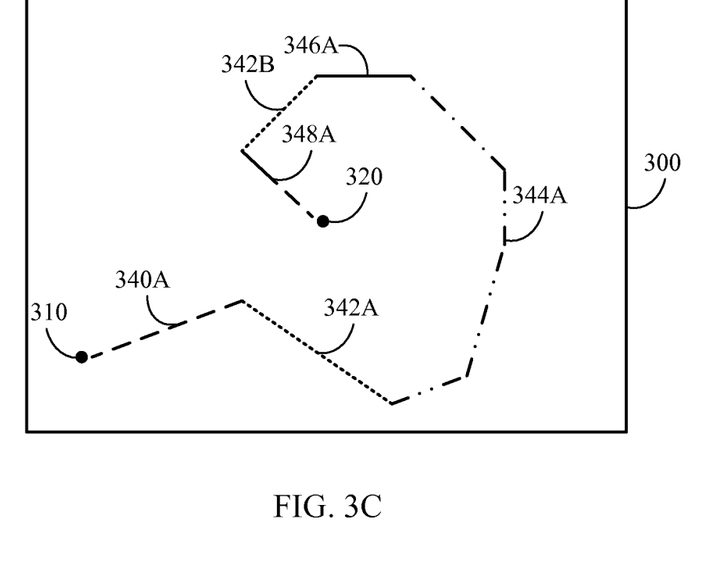
FIG. 3C is a diagram depicting a map space and a consolidated video in accordance with one embodiment of the present invention.

FIG. 3C is a diagram depicting map space 300 along with a consolidated video comprising segments from the plurality of video segments corresponding to the geographical coordinates along the user indicated path of interest 330 discussed with respect to FIG. 3A. As depicted, the consolidated video comprises video segments 340A, 342A, 342B, 344A, 346A, and 348A stemming from video segments 340, 342, 344, 346, and 348 depicted in FIG. 3B. The consolidated video only includes those segments that fall along the user indicated path of interest 330. In the depicted embodiment, two video segments 342A and 342B stem from the same larger video segment 342, while the rest of the video segments each stem from separate larger segments.

Figure 4:
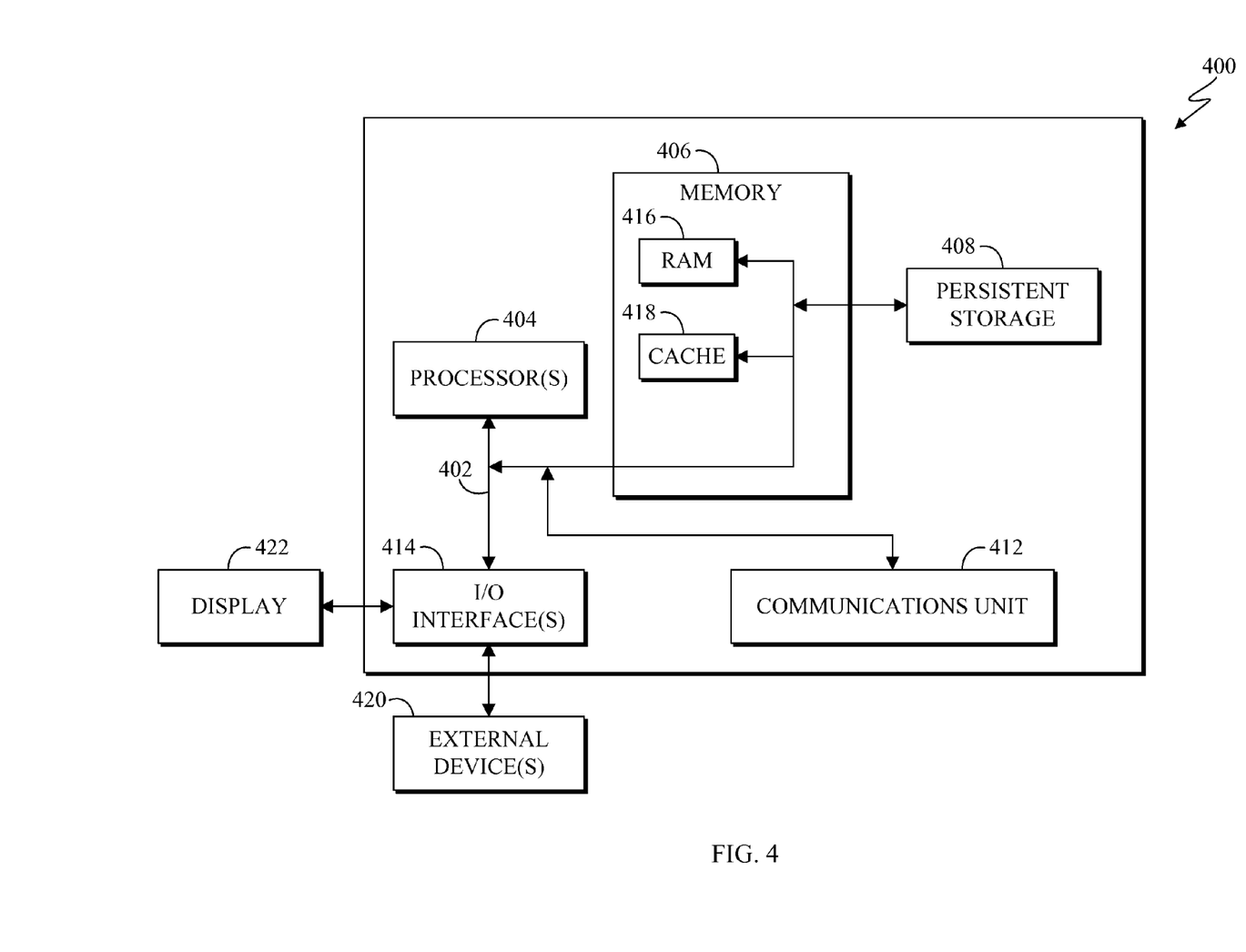
FIG. 4 depicts a block diagram of components of a computer, in accordance with some embodiments of the present invention.

FIG. 4 depicts a block diagram of components of computer 400 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

As depicted, the computer 400 includes communications fabric 402, which provides communications between computer processor(s) 404, memory 406, persistent storage 408, communications unit 412, and input/output (I/O) interface(s) 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 416 and cache memory 418. In general, memory 406 can include any suitable volatile or non-volatile computer-readable storage media.

One or more programs may be stored in persistent storage 408 for access and/or execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links.

I/O interface(s) 414 allows for input and output of data with other devices that may be connected to computer 400. For example, I/O interface 414 may provide a connection to external devices 420 such as a keyboard, keypad, a touch screen, and/or some other suitable input device. External devices 420 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 408 via I/O interface(s) 414. I/O interface(s) 414 also connect to a display 422.

Display 422 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to optimal explain the principles of the embodiment, the practical application or technical improvement over technologies found in the marketplace, or to enable others of ordinary skill in the art to understand the embodiments disclosed herein.

What is claimed is:

1. A method comprising:
receiving a user indicated path of interest on an electronic map;
determining geographical coordinates situated along the received path of interest;
identifying video content that display a plurality of regions corresponding to the geographical coordinates situated along the received path of interest;
filtering the identified video content into a set of video segments based on a set of user preferences;
identifying sections within individual video segments that correspond to the path of interest;
trimming the set of video segments to include only the identified sections within individual video segments that correspond to the path of interest; and
stitching the trimmed set of video segments into one contiguous video.

2. The method of claim 1, wherein receiving a user indicated path of interest comprises receiving a starting location and a destination location from the user.

3. The method of claim 1, wherein receiving a user indicated path of interest on an electronic map comprises receiving a gesture by the user to an input device that displays the electronic map.

4. The method of claim 3, wherein receiving a user indicated path of interest on an electronic map further comprises determining a direction of the user indicated path by analyzing a direction of the gesture made by the user to the input device.

5. The method of claim 1, wherein the set of user preferences is selected from a group of preferences consisting of: a recorded date of a video segment, a video service through which a video segment is available, and combinations thereof.

6. A computer program product for identifying a transformation map, the computer program product comprising:
one or more computer readable storage media and program instructions stored on the one or more computer readable storage media, the program instructions comprising instructions to:
receive a user indicated path of interest on an electronic map;
determine geographical coordinates situated along the received path of interest;
identify video content that display a plurality of regions corresponding to the geographical coordinates situated along the received path of interest;
filter the identified video content into a set of video segments based on a set of user preferences;
identify sections within individual video segments that correspond to the path of interest;
trim the set of video segments to include only the identified sections within individual video segments that correspond to the path of interest; and
stitch the trimmed set of video segments into one contiguous video.

7. The computer program product of claim 6, wherein program instructions to receive a user indicated path of interest comprise instructions to receive a starting location and a destination location from the user.

8. The computer program product of claim 6, wherein program instructions to receive a user indicated path of interest on an electronic map comprise instructions to receive a gesture by the user to an input device that displays the electronic map.

9. The computer program product of claim 8, wherein program instructions to receive a user indicated path of interest on an electronic map further comprise instructions to determine a direction of the user indicated path by analyzing a direction of the gesture made by the user to the input device.

10. The computer program product of claim 6, wherein the set of user preferences is selected from a group of preferences consisting of: a recorded date of a video segment, a video service through which a video segment is available, and combinations thereof.

11. A computer system for generating a consolidated video, the computer system comprising:
one or more computer processors;
one or more computer-readable storage media;
program instructions stored on the computer-readable storage media for execution by at least one of the one or more processors, the program instructions comprising instructions to:
receive a user indicated path of interest on an electronic map;
determine geographical coordinates situated along the received path of interest;
identify video content that display a plurality of regions corresponding to the geographical coordinates situated along the received path of interest;
filter the identified video content into a set of video segments based on a set of user preferences;
identify sections within individual video segments that correspond to the path of interest;
trim the set of video segments to include only the identified sections within individual video segments that correspond to the path of interest; and
stitch the trimmed set of video segments into one contiguous video.

12. The computer system of claim 11, wherein program instructions to receive a user indicated path of interest comprise instructions to receive a starting location and a destination location from the user.

13. The computer system of claim 11, wherein program instructions to receive a user indicated path of interest on an electronic map comprise instructions to receive a gesture by the user to an input device that displays the electronic map.

14. The computer system of claim 13, wherein program instructions to receive a user indicated path of interest on an electronic map further comprise instructions to determine a direction of the user indicated path by analyzing a direction of the gesture made by the user to the input device.

* * * * *